(12) United States Patent
Kinoshita et al.

(10) Patent No.: US 7,399,149 B2
(45) Date of Patent: Jul. 15, 2008

(54) SLIDE RAIL STRUCTURE OF A VEHICLE

(75) Inventors: Takanori Kinoshita, Kariya (JP);
Toshio Araki, Kariya (JP); Makoto Nakao, Chiryu (JP); Yoshihiro Kanazawa, Anjo (JP); Toshiyuki Tanaka, Kariya (JP)

(73) Assignees: Toyota Boshoku Kabushiki Kaisha, Aichi-ken (JP); Toyota Shatai Kabushiki Kaisha, Aichi-ken (JP); Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/651,416

(22) Filed: Jan. 9, 2007

(65) Prior Publication Data

US 2007/0170743 A1 Jul. 26, 2007

(30) Foreign Application Priority Data

Jan. 13, 2006 (JP) .............................. 2006-006110

(51) Int. Cl.
*B61D 45/00* (2006.01)

(52) U.S. Cl. ..................................................... 410/115

(58) Field of Classification Search ................. 410/115; 248/430, 429, 424
See application file for complete search history.

(56) References Cited

U.S. PATENT DOCUMENTS

| | | | | |
|---|---|---|---|---|
| 3,938,764 A | * | 2/1976 | McIntyre et al. ......... 244/117 R |
| 4,089,140 A | * | 5/1978 | McIntyre et al. ................ 52/98 |
| 4,213,593 A | * | 7/1980 | Weik .......................... 248/501 |
| 4,475,701 A | * | 10/1984 | Martin ..................... 244/118.6 |
| 4,723,732 A | * | 2/1988 | Gorges ..................... 244/118.6 |
| 4,936,527 A | * | 6/1990 | Gorges ..................... 244/118.6 |
| 2002/0056799 A1 | * | 5/2002 | Fujimoto et al. ............ 248/430 |
| 2007/0170743 A1 | * | 7/2007 | Kinoshita et al. ........ 296/65.13 |
| 2007/0175147 A1 | * | 8/2007 | Fiedler ......................... 52/466 |

FOREIGN PATENT DOCUMENTS

| JP | 10-315817 | 12/1998 |
|---|---|---|
| JP | 2005-112319 | 4/2005 |

* cited by examiner

*Primary Examiner*—H Gutman
(74) *Attorney, Agent, or Firm*—Patterson, Thuente, Skaar & Christensen, P.A.

(57) ABSTRACT

A slide rail structure of a vehicle for sliding a seat relative to a vehicle floor can include a rail member having an upper opening portion, a slide member, and cover members disposed on the rail member. The rail member can also include lateral portions, upper portions and downward extending portions. Each of the cover members can include a fixed portion and a cover portion. The fixed portion further can include an attaching portion attached to the rail member, and a protruding portion that protrudes into the upper opening portion. The cover portion can be positioned upward of and spaced apart from the protruding portion, so as to normally cover the upper opening portion of the rail member without contacting the protruding portion. The cover portion can also contact the protruding portion so as to be restricted from being deformed downward when the cover portion is moved downward.

6 Claims, 5 Drawing Sheets

SLIDE RAIL STRUCTURE OF A VEHICLE

This application claims priority to Japanese patent application serial number 2006-6110, the contents of which are incorporated herein by reference.

BACKGROUND OF THE INVENTION

The present invention relates to a slide rail structure of a vehicle. More specifically, the present invention relates to a slide rail structure of a vehicle that can slidably guide a vehicle seat with respect to a vehicle floor.

A conventional slide rail structure is disclosed in, for example, Japanese Laid-Open Patent Publication No. 2005-112319. The slide rail structure has a rail member for slidably guiding a seat of a vehicle and having a U-shape in cross section. The rail member is mounted on a floor surface of the vehicle. Upper edges of the rail member are respectively bent inward, so that upper bent portions are formed. As a result, a guide groove is formed within the rail member. Further, the upper edges of the rail member are bent such that a clearance is formed between the upper bent portions. Therefore, the guide groove has an upper opening portion that extends in a longitudinal direction thereof. Conversely, a slide member is attached to a lower surface of the seat. The slide member is composed of a leg portion fixed to the seat, and a slider connected to a lower end of the leg portion. The slider slidably engages the guide groove of the rail member, so that the leg portion can move along the upper opening portion of the guide groove. According to this construction, the seat can be moved along the rail member. Further, the upper bent portions may effectively prevent the slider from being released from the rail member.

In addition, a cover member is attached to the rail member. The cover member has a pair of body portions that are respectively disposed on the bent portions, and a pair of cover portions that respectively oppositely extend from the body portions so as to cover the upper opening portion of the guide groove. The cover portions are formed of elastic materials, for example, soft rubber or elastomer, so as to be easily deformed. Therefore, the cover portions that normally cover the upper opening portion are easily spread out by the leg portion when the leg portion moves along the guide groove. Therefore, a sliding motion of the leg portion (the slide member) is not obstructed by the cover portions.

However, in such a slide rail structure, the cover portions of the cover member are easily deformed. Thus, when articles (e.g., a lighter, a pebble, or the like) fall onto the cover portions, the cover portions are deformed downward. As a result, such articles can easily enter into the guide groove from the upper opening portion. The articles that have entered the guide groove may disturb the sliding motion of the slide member.

Thus, there is a need in the art for an improved slide rail structure.

BRIEF SUMMARY OF THE INVENTION

One embodiment according to the present invention includes a slide rail structure of a vehicle for sliding a seat relative to a vehicle floor which may include a rail member mounted on the vehicle floor and having an upper opening portion, a slide member having a support portion for supporting the seat, and cover members disposed on the rail member so as to extend therealong. The rail member has lateral portions, upper portions that respectively oppositely extend inward from upper ends of the lateral portions, and downward extending portions that respectively extend downward from inner ends of the upper portions. The downward extending portions define the upper opening portion therebetween. The slide member is slidably coupled to the rail member, so that the support portion can move along the upper opening portion. Each of the cover members integrally has a fixed portion formed from a hard synthetic resin and a cover portion formed from at least one of a rubber or a synthetic resin which is softer than the fixed portion. The fixed portion has an attaching portion attached to the rail member, and a protruding portion that protrudes into the upper opening portion beyond the downward extending portion of the rail member. The cover portion is positioned upward of and spaced apart from the protruding portion, so as to normally cover the upper opening portion of the rail member without contacting the protruding portion. The cover portion contacts the protruding portion so as to be restricted from being deformed downward when the cover portion is moved downward. The protruding portion is structured such that a clearance in the horizontal direction between the protruding portion and the support portion of the slide member is greater than a sliding clearance between the slide member and the rail member.

According to the slide rail structure of the present invention, when articles have fallen onto the cover portions, the cover portions are pressed and deformed downward by a pressing force of the articles. However, the downwardly deformed cover portions respectively contact the protruding portions that are positioned below the cover portions. As a result, the cover portions can be prevented from being excessively deformed downward. Thus, the upper opening portion is not excessively widely opened. Therefore, the fallen articles can be effectively prevented from entering the rail member via the upper opening portion.

Other objects, features, and advantages, of the present invention will be readily understood after reading the following detailed description together with the accompanying drawings and the claims.

DETAILED DESCRIPTION OF THE INVENTION

First, a slide rail structure of a vehicle according to one embodiment of the present invention will be described.

Figure 1:
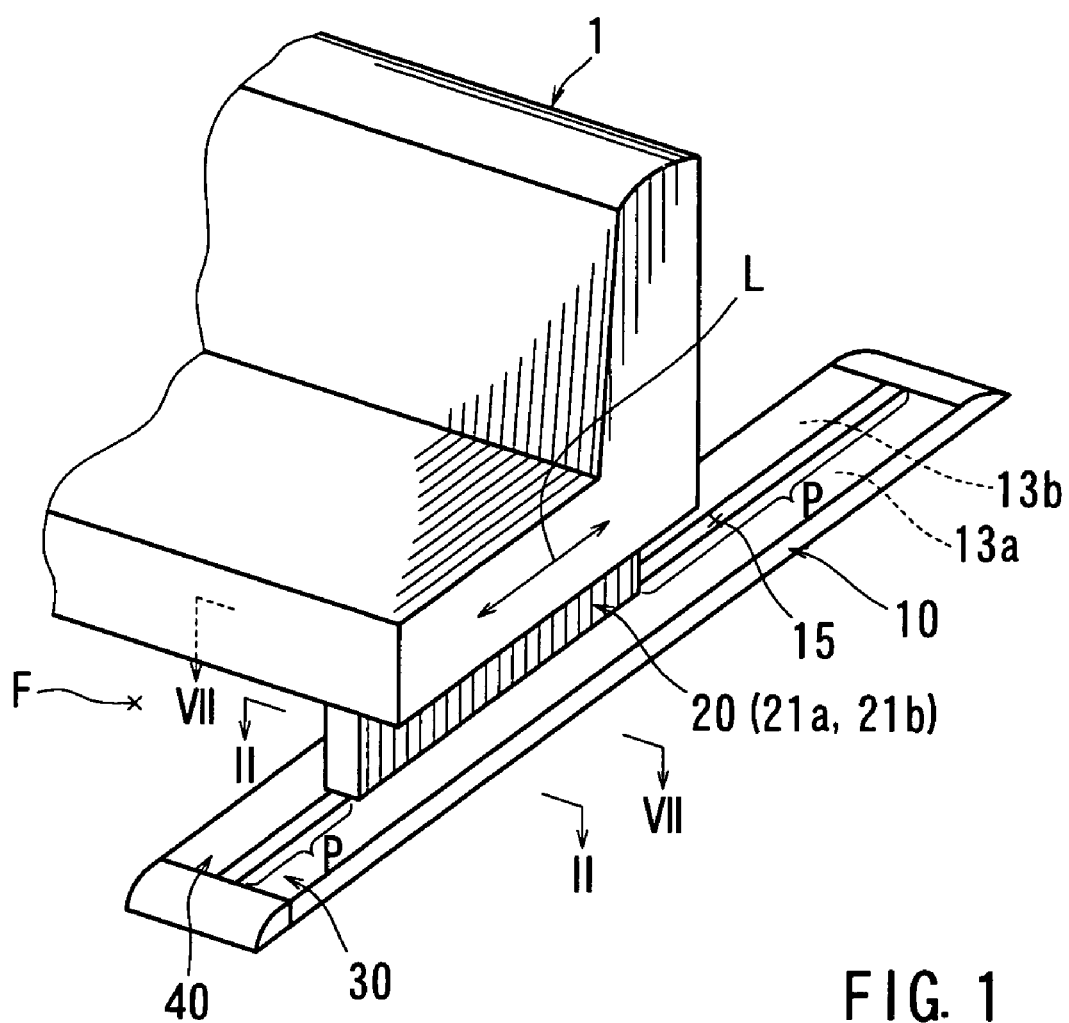
FIG. 1 is a schematic perspective view of a slide rail structure according to one embodiment of the present invention.

As shown in FIG. 1, the slide rail structure is constructed so as to slide a seat 1 in a longitudinal direction L. This slide rail structure has a rail member 10 that is mounted on a vehicle floor F, and a slide member 20 mounted on the seat 1.

The rail member 10 can have a U-shape cross section and has an upper opening portion 15 that extends along a longitudinal direction thereof. The rail member 10 is disposed so as to extend in the longitudinal direction L of the vehicle.

The slide member 20 has a "support portion" for supporting the seat 1, and a "slide portion" that is integrated with the support portion. The "support portion" is connected to the seat 1. The "slide portion" slidably coupled to the rail member 10, so that the "support portion" can move along the upper opening portion 15.

Cover members 30 and 40 for covering the upper opening portion 15 are respectively attached to upper portions 13a and 13b of the rail member 10. The cover members 30 and 40 respectively have fixed portions 31 and 41, and cover portions 32 and 42 that are respectively attached to the fixed portions 31 and 41. The cover portions 32 and 42 can be formed from soft or elastic materials, or the like, so as to have elasticity or deformability. As shown by broken lines in FIG. 2, the cover portions 32 and 42 are arranged and constructed so as to normally cover the upper opening portion 15. However, because the cover portions 32 and 42 are deformable, the cover portions 32 and 42 are easily spread out upward by the support portion as shown by solid lines in FIG. 2 when the support portion moves along the upper opening portion 15. Therefore, a sliding motion of the slide portion (the slide member 20) is not obstructed by the cover portions. Conversely, the fixed portions 31 and 41 are preferably formed such that opposed inner edges thereof respectively have uniquely shaped portions (which will be described hereinafter). Therefore, even if articles (e.g., a lighter, a pebble, or the like) have fallen onto the cover portions 32 and 42, the cover portions 32 and 42 are effectively prevented from being excessively deformed downward, so that the articles are prevented from easily entering the rail member 10 via the upper opening portion 15.

Figure 2:
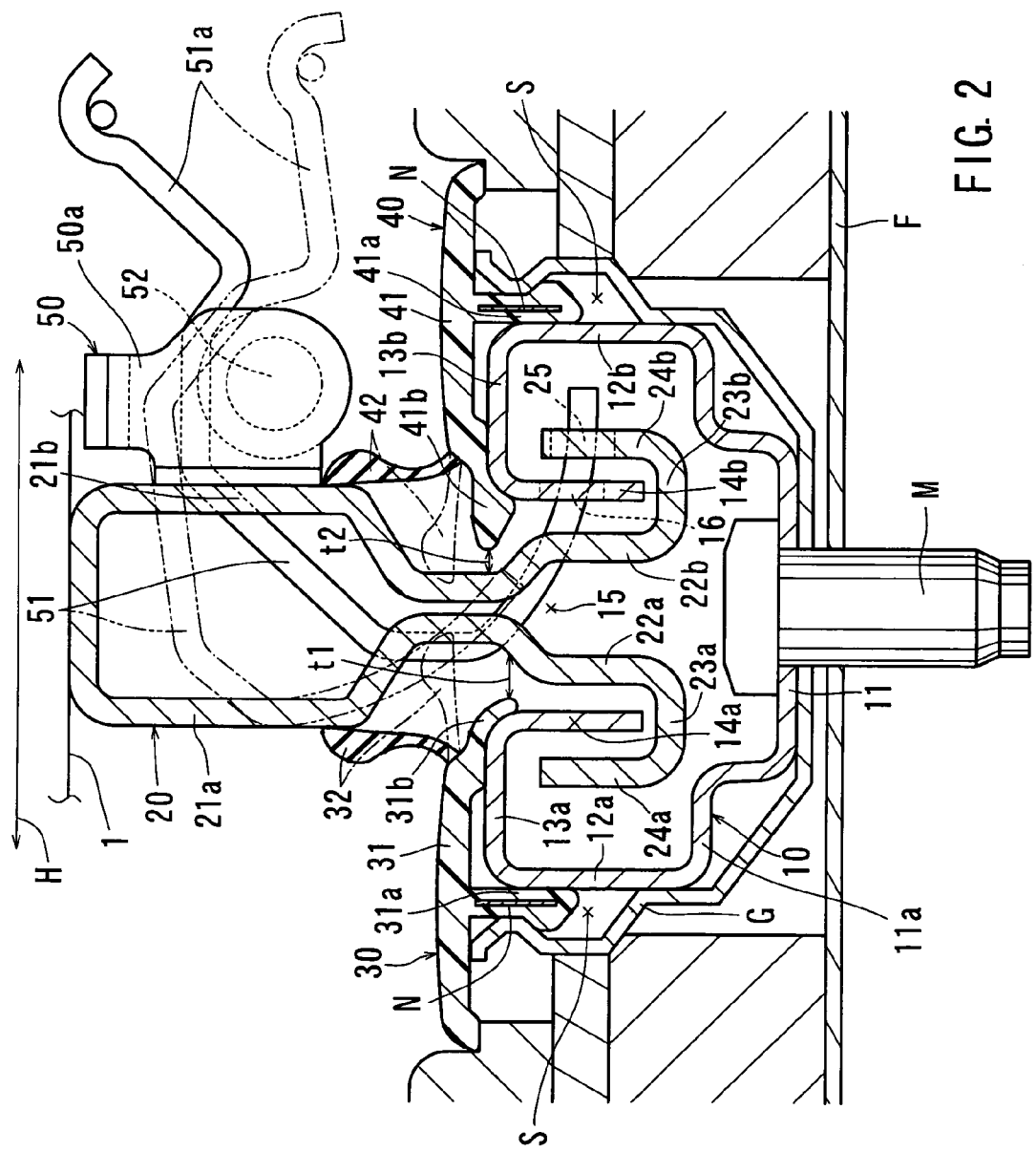
FIG. 2 is a cross-sectional view taken along line II-II in FIG. 1.

As shown in FIG. 2, the rail member 10 may preferably be integrally formed by bending and forming a metal plate. The rail member 10 has a bottom portion 11 having shoulder portions 11a and 11b, a pair of lateral portions 12a and 12b respectively extending upward from the bottom portion 11, upper portions 13a and 13b, respectively oppositely extending inward from upper ends of the lateral portions 12a and 12b, and downward extending portions 14a and 14b respectively extending downward from inner ends of the upper portions 13a and 14b. The upper opening portion is defined between the downward extending portions 14a and 14b. Further, a plurality of lock holes 16 are formed in the downward extending portion 14b. Each of the lock holes 16 can be arranged so as to be engageable with a lock pawl 51 of a lock mechanism 50 (which will be described hereinafter). The lock holes 16 are formed in the downward extending portion 14b at predetermined intervals along the longitudinal direction of the rail member 10.

As shown in FIG. 2, the rail member 10 is capable of being fixed to the floor F by means of a fixing bolt M. In fact, the fixing bolt M interconnects the bottom portion 11 of the rail member 10 and the floor F. The rail member 10 is provided with a plurality of (e.g., four or five) fixing members G and is fixed to the vehicle floor F together with the fixing members G. Each of the fixing members G may preferably be formed such that clearances S are defined between the fixing member G and the lateral portions 12a and 12b. The clearances S may respectively receive attaching portions 31a and 41a of the cover members 30 and 40 (which will be described hereinafter). Further, the fixing members G are positioned at substantially equal intervals along the longitudinal direction of the rail member 10.

As best shown in FIG. 2, the slide member 20 is integrally formed by bending and forming a metal plate. The slide member 20 has leg portions 21a and 21b, lateral portions 22a and 22b respectively located below the leg portions 21a and 21b, bottom portions 23a and 23b respectively oppositely extending outward from lower ends of the lateral portions 22a and 22b, and upward extending portions 24a and 24b respectively extending upward from outer ends of the bottom portions 23a and 23b. The leg portions 21a and 21b may constitute the "support portion" for supporting the seat 1. Conversely, the lateral portions 22a and 22b, the bottom portions 23a and 23b and the upward extending portions 24a and 24b may constitute the "slide portion" that can move along the rail member 10. As will be apparent from FIG. 2, the leg portions 21a and 21b are respectively coupled to the lateral portions 22a and 22b via inward curved transition portions. Therefore, the slide member 20 has an hourglass-shaped constricted portion of which the dimension in a horizontal direction H is narrowed. In other words, the "support portion" and the "slide portion" of the slide member 20 are interconnected via the constricted portion. The lateral portions 22a and 22b, and the upward extending portions 24a and 24b may preferably be formed so as to be respectively positioned laterally adjacent to both sides of the downward extending portions 14a and 14b of the rail member 10 when the slide member 20 is coupled to the rail member 10. That is, the slide member 20 may preferably be formed such that the downward extending portions 14a and 14b of the rail member 10 are respectively interposed between the upward extending portions 24a and 24b and the lateral portions 22a and 22b. Further, a lock hole 25 is formed in the upward extending portion 24b. The lock hole 25 is arranged and constructed so as to be engaged with the lock pawl 51 of the lock mechanism 50. Further, as shown by solid lines in FIG. 2, the lock hole 25 is formed on a moving trajectory of the lock pawl 51. Therefore, when the lock hole 25 is aligned with one of the lock holes 16 of the rail member 10, the lock pawl 51 can engage the lock bole 25 and the lock hole 16 of the rail member 10. As will be appreciated, when the lock pawl 51 engages the lock hole 16 and the lock hole 25, the slide member 20 is locked on the rail member 10. As a result, the slide member 20 and the rail member 10 are prevented from moving relative to each other.

As described above, the slide member 20 is coupled to the rail member 10 while the downward extending portions 14a and 14b of the rail member 10 are respectively interposed between the upward extending portions 24a and 24b and the lateral portions 22a and 22b. Therefore, the slide member 20 may preferably be prevented from being released from the rail member 10.

Figure 7:
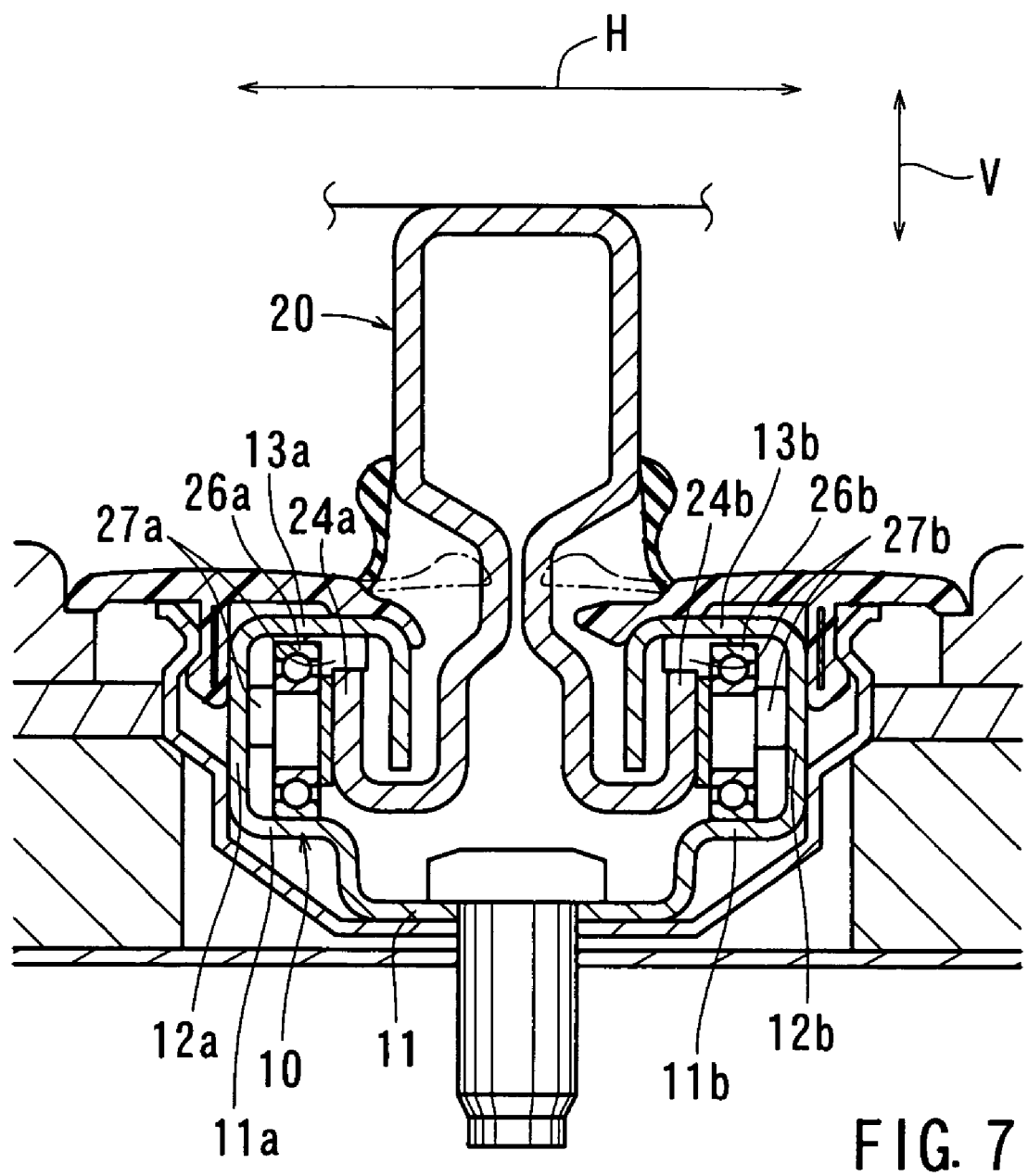
FIG. 7 is a cross-sectional view taken along line VII-VII in FIG. 1.

As shown in FIG. 7, a plurality of pairs of rollers 26a and 26b are respectively attached to outer surfaces of the upward extending portions 24a and 24b of the slide member 20. The rollers 26a and 26b are disposed at predetermined intervals along a longitudinal direction of the slide member 20. The rollers 26a and 26b may preferably be positioned so as to respectively rotate along the shoulder portions 11a and 11b of the bottom portion 11 of the rail member 10. Therefore, the slide member 20 can smoothly slide along the rail member 10.

As shown in FIG. 7, guide members 27a and 27b are respectively disposed on the outer surfaces and upper end surfaces of the upward extending portions 24a and 24b of the slide member 20. The guide members 27a and 27b are arranged and constructed so as to slidably engage the lateral portions 12a and 12b and the upper portions 13a and 13b of the rail member 10. This means that a minimum sliding clearance (not shown) is formed between the guide members 27a and 27b and the lateral portions 12a and 12b and the upper portions 13a and 13b of the rail member 10 (i.e., between slide member 20 and rail member 10). Therefore, the slide member 20 may be effectively prevented from rattling in a vertical direction V as well as the horizontal direction H. Consequently, the slide member 20 can smoothly slide along the rail member 10. The guide members 27a and 27b may preferably be formed from a hard synthetic resin having low sliding friction (e.g., a phenol resin, or the like).

Further, as shown in FIG. 2, the lock mechanism 50 that can restrict the sliding motion of the slide member 20 is attached to the leg portion 21b of the slide member 20. The lock mechanism 50 may include the hook-shaped lock pawl 51 that can engage the lock hole 25 of the slide member 20 and the lock holes 16 of the rail member 10. The lock mechanism 50 may further include an attachment 50a fixed to the leg portion 21b, and an operating handle 51a mounted on the lock pawl 51. The lock pawl 51 is pivotally connected to the attachment 50a via a pivot pin 52 so as to be operated using the operating handle 51a. In addition, the lock pawl 51 is connected to a spring member (not shown) that is mounted on the pivot pin 52, so as to be normally urged counterclockwise in FIG. 2, i.e., so as to normally urged toward the lock holes 16 and 25.

As shown in FIG. 2, the lock pawl 51 rotates about the pivot pin 52, thereby moving along the circular moving trajectory that intersects with the slide member 20. Therefore, the slide member 20 is partially cut off so as to be prevented from interfering with the lock pawl 51. Further, the lock pawl 51 is arranged and constructed such that the moving trajectory thereof does not intersect with the rail member 10.

The cover members 30 and 40 respectively correspond to the upper portions 13a and 13b of the rail member 10. As shown in FIG. 2, the cover members 30 and 40 may preferably have a substantially symmetrical shape in cross section each other except for a portion thereof. First, the outer cover member 30 can have the plate-shaped fixed portion 31 that extends along the upper portion 13a of the rail member 10, and the cover portion 32 that is integrated with the fixed portion 31. The fixed portion 31 is formed from hard synthetic resins. The hard synthetic resins can include polyolefin resins and polystyrene resins. A polypropylene resin is preferred because the polypropylene resin is less expensive and has high heat resistance. The cover portion 32 can be formed from materials softer than the fixed portion 31, so that the cover portion 32 can be easily deformed. Soft rubbers are preferred as such materials. However, it is possible to use thermoplastic elastomers, e.g., polyolefin synthetic resins, polystyrene synthetic resins or other such resins.

A lower surface of the fixed portion 31 can be integrally formed with the attaching portion 31a. The attaching portion 31a is inserted into the clearances S that are defined between the lateral portion 12a of the rail member 10 and the fixing members G, so that the fixed portion 31 (cover member 30) is attached to the rail member 10. Further, the attaching portion 31a may preferably be designed so as to be detached from the clearances S when an abnormal force is applied thereto, for example, when a heavy article has fallen onto the rail member 10. Such a design is intended to prevent, or reduce the possibility of, the fixed portion 31 from being damaged. In addition, the attaching portion 31a may preferably have a metal strip N in order to increase the rigidity of the cover member 30 (see FIGS. 3 and 4). The metal strip N may generally be embedded in the attaching portion 31a by insert-molding. Moreover, a protruding portion 31b may preferably be formed in an inner edge of the fixed portion 31. The protruding portion 31b protrudes into the upper opening portion 15 beyond the downward extending portion 14a of the rail member 10, and is curved downward so as to cover an upper end portion of the downward extending portion 14a of the rail member 10. As will be recognized, the protruding portion 31b has a desired size so as to be spaced apart from the moving trajectory of the lock pawl 51. Therefore, the protruding portion 31b can be prevented from interfering with the lock pawl 51. Further, the protruding portion 31b may preferably be designed such that a clearance t1 in the horizontal direction H formed between the protruding portion 31b and the leg portion 21a of the slide member 20 is greater than the sliding clearance between the slide member 20 and the rail member 10. As a result, the protruding portion 31b does not interfere with the slide member 20 when the slide member 20 slides along the rail member 10.

Figure 3:
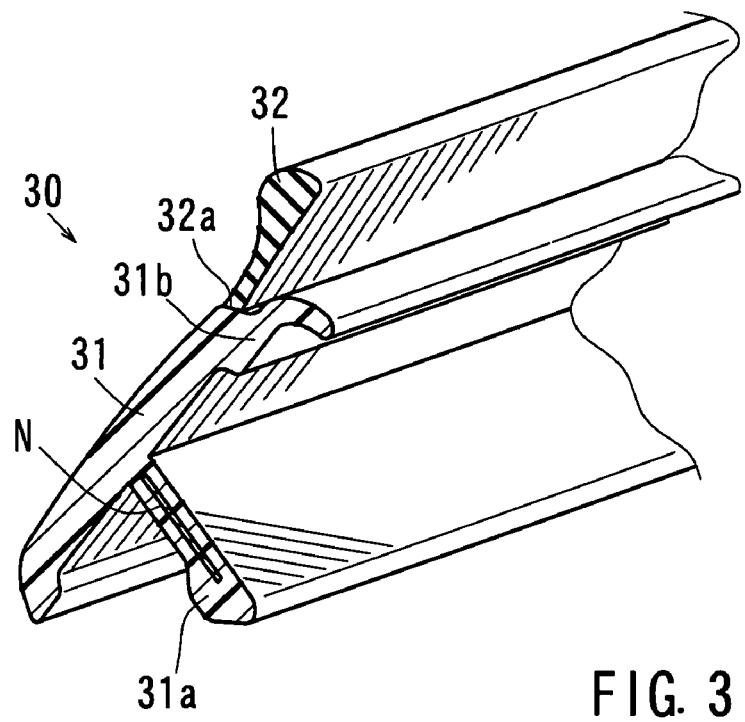
FIG. 3 is a perspective view of an outer cover member.
Figure 4:
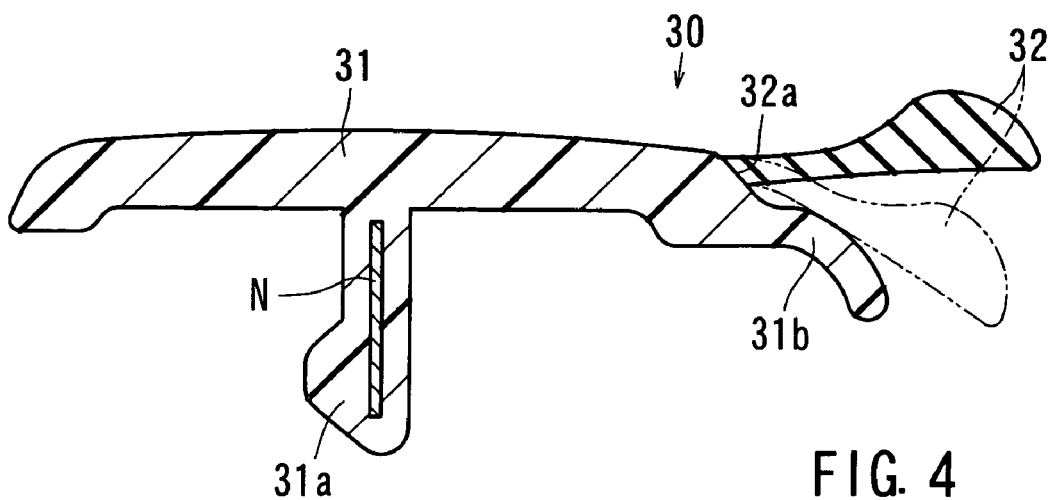
FIG. 4 is a transverse sectional view of the cover member of FIG. 3.
Figure 5:
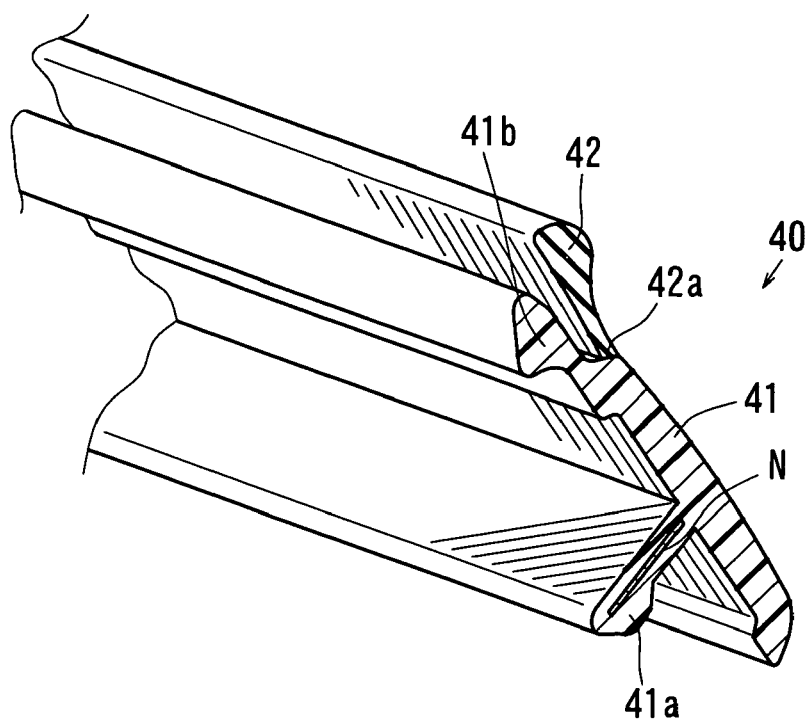
FIG. 5 is a perspective view of an inner cover member.

As best shown in FIG. 3, the cover portion 32 is disposed on the inner edge of the fixed portion 31 so as to be positioned upward of and spaced apart from the protruding portion 31b. As shown by broken lines in FIG. 2, the cover portion 32 normally covers the upper opening portion 15 of the rail member 10. However, when the slide member 20 moves along the rail member 10, the cover portion 32 is easily spread out by the slide member 20 as shown by solid lines in FIG. 2 because the cover portion 32 can be easily deformed. Thus, the sliding motion of the slide member 20 is not precluded by the cover portion 32.

As will be appreciated, when the articles have fallen onto the cover portion 32, the cover portion 32 is pressed and deformed downward by a pressing force of the articles. However, as shown by broken lines in FIG. 4, the downwardly deformed cover portion 32 contacts the protruding portion 31b. As a result, the cover portion 32 can be effectively prevented from being excessively deformed downward.

The inner cover member 40 may have the plate-shaped fixed portion 41 that extends along the upper portion 13b of the rail member 10, and the cover portion 42 that is integrated with the fixed portion 41. Similar to the fixed portion 31, the fixed portion 41 is formed from a hard synthetic resin. In addition, similar to the cover portion 32, the cover portion 42 is formed from soft materials so as to be easily deformed.

A lower surface of the fixed portion 41 is integrally formed with the attaching portion 41a. The attaching portion 41a has the same structure as the attaching portion 31a. A protruding portion 41b may preferably be formed in an inner edge of the fixed portion 41. The protruding portion 41b protrudes into the upper opening portion 15 beyond the downward extending portion 14b of the rail member 10, and covers an upper end portion of the downward extending portion 14b of the rail member 10. The protruding portion 41b is thickened and has a shape in cross section that is different from the shape of the protruding portion 31b. The thickened protruding portion 41b has a desired size so as to be spaced apart from the moving trajectory of the lock pawl 51. Therefore, the protruding portion 41b can be prevented from interfering with the lock pawl 51. Similar to the protruding portion 31b, the protruding portion 41b may preferably be designed such that a clearance t2 in the horizontal direction H formed between the protruding portion 41b and the leg portion 21b of the slide member 20 is greater than the sliding clearance between the slide member 20 and the rail member 10. As a result, the protruding portion 41b does not interfere with the slide member 20 when the slide member 20 slides along the rail member 10.

Figure 6:
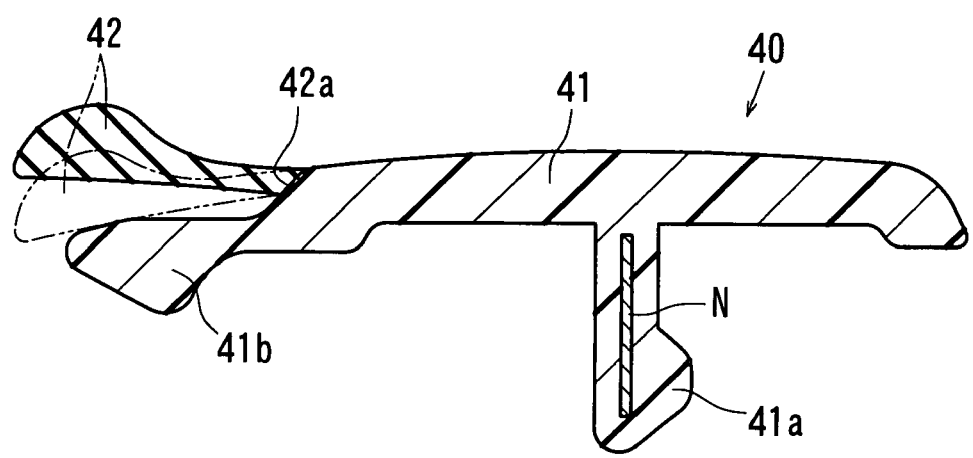
FIG. 6 is a transverse sectional view of the cover member of FIG. 5.

As best shown in FIG. 6, similar to the cover portion 32, the cover portion 42 is disposed on the inner edge of the fixed portion 41 so as to be positioned upward of and spaced apart from the protruding portion 41b. As shown by broken lines in FIG. 2, the cover portion 42 normally covers the upper opening portion 15 of the rail member 10. However, when the slide member 20 moves along the rail member 10, the cover portion 42 is easily spread out by the slide member 20 as shown by solid lines in FIG. 2 because the cover portion 42 can be easily deformed. As a result, the sliding motion of the slide member 20 is not precluded by the cover portion 42.

Similar to the cover portion 32, when the articles have fallen onto the cover portion 42, the cover portion 42 is pressed and deformed downward by the pressing force of the articles. However, as shown by broken lines in FIG. 6, the downwardly deformed cover portion 42 contacts the protruding portion 41b. As a result, the cover portion 42 can be effectively prevented from being excessively deformed downward.

As described above, the substantial clearance t1 is formed between the protruding portion 31b of the cover member 30 and the leg portion 21a. Similarly, the substantial clearance t2 is formed between the protruding portion 41b of the cover member 40 and the leg portion 21b. However, as described above, the guide members 27a and 27b are attached to the slide member 20. The guide members 27a and 27b respectively slidably contact the lateral portions 12a and 12b and the upper portions 13a and 13b of the rail member 10. Therefore, the slide member 20 can be prevented from rattling relative to the rail member 10.

Next, an operation of the slide rail structure thus constructed will be described. In order to move the seat 1 along the rail member 10, the operating handle 51a is first manually operated to turn the lock pawl 51 clockwise against a spring force of the spring member. As a result, as shown by broken lines in FIG. 2, the lock pawl 51 is removed from the lock hole 25 and the lock hole 16, so that the slide member 20 is unlocked from the rail member 10. At this time, the lock pawl 51 move or rotate passing between the fixed portions 31 and 41 (the protruding portions 31b and 41b) of the cover members 30 and 40. Thus, the "slide portion" of the slide member 20 can move or slide along the rail member 10, so that the seat 1 supported by the "support portion" of the slide member 20 can move along the rail member 10.

On the contrary, in order to fix the seat 1 to the rail member 10, the seat 1 is first moved to a predetermined position, so that the lock hole 25 is aligned with one of the lock holes 16. In this condition, the operating handle 51a is released. As a result, the lock pawl 51 is rotated counterclockwise due to the spring force of the spring member. Thus, as shown by solid lines in of FIG. 2, the lock pawl 51 automatically engages the lock holes 16 and 25, so that the slide member 20 is locked to the rail member 10. At this time, the lock pawl 51 move or rotate passing between the fixed portions 31 and 41 (the protruding portions 31b and 41b) of the cover members 30 and 40. As a result, the "slide portion" of the slide member 20 cannot move along the rail member 10, so that the seat 1 supported by the "support portion" is fixedly positioned on the rail member 10.

As shown by broken lines in FIG. 2, the cover portions 32 and 42 of the cover members 30 and 40 normally cover the upper opening portion 15 of the rail member 10. That is, a section P (FIG. 1) of the upper opening portion 15 in which the slide member 20 does not exist is covered with the cover portions 32 and 42. Therefore, when the slide member 20 moves along the rail member 10 (when the seat 1 moves along the rail member 10), the slide member 20 must upwardly spread out the cover portions 32 and 42 as shown by solid lines in FIG. 2. However, the cover portions 32 and 42 can be easily deformed or spread out. Therefore, the slide member 20 can move smoothly along the rail member 10.

When the articles have fallen onto the section P of the upper opening portion 15, the cover portions 32 and 42 that cover the section P are pressed downward. As a result, the cover portions 32 and 42 are easily deformed downward. However, as shown by broken lines in FIGS. 4 and 6, the downwardly deformed cover portions 32 and 42 respectively contact the protruding portions 31b and 41b that are positioned below the cover portions 32 and 42. As a result, the cover portions 32 and 42 can respectively be prevented from being excessively deformed downward. Therefore, the upper opening portion 15 is not excessively widely opened. Thus, the articles can be effectively prevented from entering the rail member 10 via the upper opening portion 15. In addition, the protruding portions 31b and 41b respectively contact the downward extending portions 14a and 14b of the rail member 10. That is, the protruding portions 31b and 41b are respectively supported by the downward extending portions 14a and 14b. Therefore, the protruding portions 31b and 41b can withstand a large downward force. As a result, the cover portions 32 and 42 can be reliably prevented from being excessively deformed downward even if the fallen articles are heavy articles.

Further, as described above, the protruding portions 31b and 41b are arranged and constructed so as not to interfere with the slide member 20. Therefore, the protruding portions 31b and 41b do not preclude the sliding motion of the slide member 20.

According to the slide rail structure of the present invention, it is possible to effectively prevent the articles from entering the rail member 10 without disturbing the sliding motion of the slide member 20.

Because the fixed portions 31 and 41 of the cover members 30 and 40 are respectively made from the harder materials, the cover members 30 and 40 can be stably attached to the rail member 10. Therefore, the rail member 10 can maintain a good appearance.

One skilled in the art will appreciated that the embodiments of the present invention describe above may be modified. For example, the protruding portions 31b and 41b of the cover members 30 and 40 may respectively be formed so as not to contact the downward extending portions 14a and 14b of the rail member 10. Further, the protruding portions 31b and 41b of the cover members 30 and 40 may be formed so as to have a completely symmetrical shape in cross section each other. Moreover, the fixed portions 31 and 41 of the cover members 30 and 40 may respectively be formed so as to partially cover the upper portions 13a and 13b of the rail member 10.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A slide rail structure of a vehicle for sliding a seat relative to a vehicle floor, comprising:
   a rail member mounted on the vehicle floor and having an upper opening portion, the rail member having lateral portions, upper portions that respectively oppositely extend inward from upper ends of the lateral portions, and downward extending portions that respectively extend downward from inner ends of the upper portions, the downward extending portions defining the upper opening portion therebetween;

a slide member having a support portion for supporting the seat, the slide member being slidably coupled to the rail member, so that the support portion can move along the upper opening portion; and cover members disposed on the rail member so as to extend therealong, each of the cover members integrally having a fixed portion formed from a hard synthetic resin and a cover portion formed from at least one of a rubber or a synthetic resin which is softer than the fixed portion, wherein the fixed portion has an attaching portion attached to the rail member, and a protruding portion that protrudes into the upper opening portion beyond the downward extending portion of the rail member, wherein the cover portion is positioned upward of and spaced apart from the protruding portion, so as to normally cover the upper opening portion of the rail member without contacting the protruding portion, wherein the cover portion contacts the protruding portion so as to be restricted from being deformed downward when the cover portion is moved downward, and wherein the protruding portion is structured such that a clearance in the horizontal direction between the protruding portion and the support portion of the slide member is greater than a sliding clearance between the slide member and the rail member.

2. A slide rail structure of a vehicle as defined in claim 1, wherein the protruding portions of the cover members are respectively positioned adjacent to upper end portions of the downward extending portions of the rail member.

3. A slide rail structure of a vehicle as defined in claim 1, wherein the fixed portions of the cover members are arranged and constructed so as to respectively cover the upper portions of the rail member.

4. A slide rail structure of a vehicle as defined in claim 1, wherein the fixed portions of the cover members are arranged and constructed so as to be spaced apart from a moving trajectory of a lock pawl of a lock mechanism.

5. A slide rail structure of a vehicle as defined in claim 4, wherein the fixed portions of the cover members are respectively disposed on the upper portions of the rail member such that the lock pawl can move passing therebetween.

6. A slide rail structure of a vehicle as defined in claim 1, wherein the protruding portions of the fixed portions respectively contact the downward extending portions of the rail member so as to be supported by the downward extending portions.

* * * * *